Patented Feb. 11, 1947

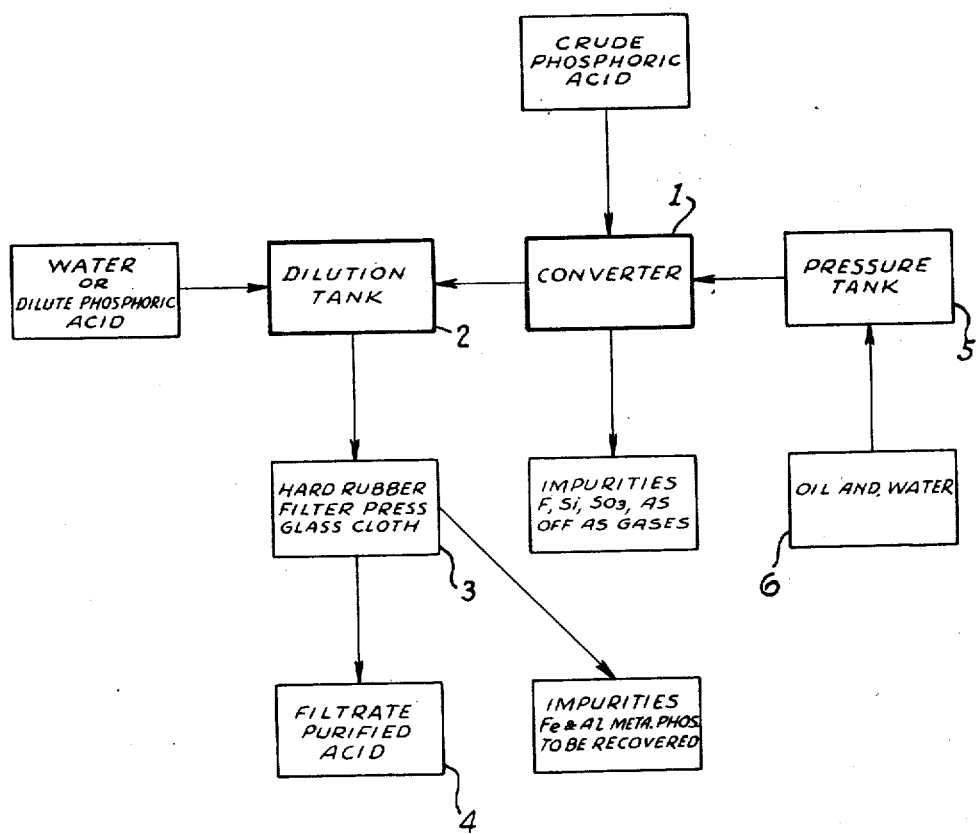

2,415,797

UNITED STATES PATENT OFFICE 2,415,797

PREPARATION OF PURE PHOSPHORIC ACID

Frank S. Low, Bronxville, N. Y., assignor to Westvaco Chlorine Products Corporation, New York, N. Y., a corporation of Delaware Application October 2, 1942, Serial No. 460,470

6 Claims. (Cl. 23—165)

1

This invention relates to a process for the preparation of a pure phosphoric acid and more particularly it relates to a process for purifying phosphoric acid made by the acid-digestion process to render it suitable for the production of food-grade products such as acid sodium pyrophosphate ($Na_2H_2P_2O_7$), monocalcium phosphate ($CaH_4(PO_4)_2$), and other products.

In the hydrolytic process for making phosphoric acid, calcium orthophosphate contained in raw phosphates such as rock phosphates, pebble phosphates, apatite, and other phosphate-containing minerals is digested with sulfuric acid, precipitating calcium sulfate and yielding a dilute phosphoric acid. The calcium sulfate and gangue are separated from the liquid phosphoric acid, usually by filtration, and the acid is evaporated to the desired concentration.

The crude acid produced by this process is contaminated by a number of substances contained in the reacting raw materials, such as calcium, iron, aluminum, fluorine, silicon, and chromium compounds. Smaller amounts of arsenic, manganese, and lead are also occasionally present. These contaminants render the phosphoric acid unsuitable for preparation of food-grade products and, accordingly, it is necessary to remove these deleterious substances. Methods have been devised for the removal of some of these impurities, but in general none of the processes has been completely successful and none of them has resulted in satisfactory removal of iron and aluminum compounds, which occur in considerable quantity in hydrolytic phosphoric acid or in the production of phosphoric acid of a purity demanded by current commercial requirements.

Accordingly, an object of the present invention is a simple and cheap method of making phosphoric acid of high purity from crude phosphoric acid containing metallic impurities by heating the crude acid until the impurities become insoluble and separating the insoluble impurities from the acid.

Another object is a process for the preparation of food-grade phosphoric acid from crude phosphoric acid made by the acid-digestion process by heating the crude acid at an elevated temperature until the iron and aluminum compounds contained in the acid become insoluble in the acid

2 and any impurities such as fluorine, silicon, sulphur, or arsenic compounds separate from the acid by volatilization, and separating the insoluble iron and aluminum compounds from the acid.

Still another object is the provision of a process for the removal of impurities, such as iron and aluminum salts, from phosphoric acid by heating the acid to an elevated temperature until the iron and aluminum salts are converted into insoluble metaphosphates, which may be readily separated from the acid, and diluting the acid and separating the iron and aluminum metaphosphates from the acid.

Various other objects and advantages of my invention will appear in the detailed description thereof, which follows.

I have discovered that iron and aluminum compounds in crude phosphoric acid may be separated from the acid if the acid is heated to an elevated temperature, usually above about 300° C., until these impurities are converted into insoluble metaphosphates, which may be separated from the mass of acid and removed from it by filtration or other methods. Furthermore, troublesome impurities, such as fluorine, arsenic, sulfur as $SO_3$, and a certain amount of the silicon as fluo-silicic acid, separate from the phosphoric acid by volatilization during the heating operation.

The drawing illustrates a flow sheet showing a preferred method of operation. Crude concentrated phosphoric acid which may have been prepared by acid digestion of phosphate rock or in any other way and which may contain substantial quantities of iron and aluminum compounds and lesser amounts of fluorine, silicon, arsenic, and some sulfur, as sulfates, is passed into a reactor or converter 1, made of an acid-resistant material, such as a carbon-lined construction material, where it is heated to a temperature above 300° C., preferably about 400° C., until the iron and aluminum salts in the acid are converted to insoluble compounds. The converter may be heated in a number of ways. I have found that a convenient method is to blow hot gases from a pressure tank 5 through the acid, although the acid may be heated with strip heaters or in other ways. The hot gases are prepared by combustion of oil from 6 in a pressure furnace and stored in a reservoir 5. This heating operation may be either a batch process or it may preferably be made continuous. During the heating operation, the water is driven off from the 65° Bé orthophosphoric acid and the acid is converted to metaphosphoric acid. The iron and aluminum compounds in the acid are converted to metaphosphates, which are insoluble in phosphoric acid. The metaphosphoric acid from the converter is diluted with water or dilute phosphoric acid, thereby reforming orthophosphoric acid, in a unit 2, and the iron and aluminum metaphosphates remain as insoluble and are filtered out in filter units 3, yielding purified, food-grade phosphoric acid 4.

During the heating operation in the converter 1, fluorine, silicon, sulfur, and arsenic are removed as volatile compounds. The insoluble iron and aluminum metaphosphates separated out may be recovered as such or the phosphate values may be recovered by a soda-ash fusion process or any other suitable process.

In a typical procedure illustrative of the above process, crude 65° Bé. acid, containing 4.8 percent aluminum phosphate, 3.0 percent iron phosphate, 3200 P. P. M. fluorine, .7 percent SO₃, and .02 percent calcium phosphate, all based on total $P_2O_5$ content, was heated for a half-hour at 350° C., and the insoluble metaphosphates separated out after dilution by filtration. The final composition was aluminum phosphate .2 percent, iron phosphate .22 percent, fluorine 17 P. P. M., and SO₃ negligible. Calcium phosphate remained at .02 percent. Arsenic, nickel, and lead content were reduced to a low level. Further treatment of the same acid in the converter, or treatment at higher temperatures, would result in reduction of impurities to even lower levels.

Any crude phosphoric acid made by hydrolytic methods may be fed to the converter and purified by the process. One such acid which has been successfully treated is shown and described in an application of Coleman and Poll, Serial No. 365,126, filed November 9, 1940, now Patent No. 2,338,407, issued January 4, 1944. This purification process may also be used in conjunction with other methods for preparing hydrolytic phosphoric acid. In fact, any phosphoric acid containing iron and aluminum compounds as impurities may be purified in this way.

The effect of time of heating, and temperature in the converter on the removal of iron and aluminum compounds is illustrated in Table I.

TABLE I

*Effect of time and temperature in converter*

| | Percent FeAlPO₄ ($P_2O_5$ basis) |
|---|---|
| Crude acid | 7.8 |
| After 1 hr. at 350° | 0.43 |
| After 3 hrs. at 350° | 0.36 |
| After 5 hrs. at 350° | 0.35 |
| After 2 hrs. at 350–400° | 0.36 |
| After additional 1 hr. at 400° | 0.28 |

In general, 400° C. is a convenient temperature at which to effect the formation of insoluble iron and aluminum metaphosphates. At atmospheric pressure, the process operates at a temperature as low as 300° C. The upper limit in temperature is determined principally by the corrosion resistance of the equipment. Carbon-lined reaction vessels have been found satisfactory to reduce the high rate of corrosion encountered in the use of hot metaphosphoric acid.

During the heating operation in the converter, the volatile impurities are driven off as gases. Table II shows the removal of fluorine, with time of heating at 350° C.

TABLE II

| Acid | Fluorine ($P_2O_5$ basis) |
|---|---|
| | P. P. M. |
| Crude acid | 3,240 |
| After 5.0 hrs. at 325° C | 179 |
| After 0.5 hrs. at 350° C | 17 |
| After 2.5 hrs. at 350° C | 8 |
| After 4.5 hrs. at 350° C | 3 |
| After 6.8 hrs. at 350° C | 3 |

Similarly, other volatile impurities contained in the acid, such as silicon, sulfur, and arsenic, and minor amounts of other volatile materials are driven off and this is an additional advantage of my process.

Since metaphosphoric acid is a thick, viscous liquid which becomes a solid at room temperatures, it is necessary to dilute it with water to permit the separation of insoluble metallic metaphosphates such as iron and aluminum metaphosphates from the metaphosphoric acid. During this dilution operation, considerable heat is generated and to prevent the resolution of the insoluble metaphosphates, with a reconversion of the metaphosphates to soluble orthophosphates, cooling of the dilution water has been found desirable.

Resolution of the iron and aluminum metaphosphates is a function of the temperature of the solution and the time of contact of the diluted acid with the precipitate. When the diluted acid is maintained at a temperature below 75° C., resolution of the precipitated metaphosphates is reduced to a low level even after considerable time of contact. It is possible to dilute at temperatures above 75° C. if the time of contact between the precipitate and the acid is short. I prefer to effect the dilution below about 75° C., since careful control is required above that point.

The dilution water is heated by the sensible heat of the acid from the converter, and also by the heat of dilution of the converter acid. To minimize this latter effect, the use of dilute phosphoric acid has been found advantageous.

Phosphoric acid produced by this process has been used to produce acid sodium pyrophosphate, and this product was found to meet the standards as to permissible impurities and color for a food-grade product. Other food-grade products, such as acid calcium phosphate, were made and found to be suitable in all respects.

I claim:

1. A process for removal of volatile impurities and iron and aluminum salts from crude phosphoric acid which comprises heating the phosphoric acid produced by the acid digestion of phosphate bearing rock to an elevated temperature for a predetermined period of time until the volatile impurities in the acid are driven off from the acid and the iron and aluminum salts contained in the acid are converted into insoluble metaphosphates, and the phosphoric acid converted into metaphosphoric acid, converting the metaphosphoric acid into phosphoric acid by diluting the liquid metaphosphoric acid mass with water, maintaining the diluted liquid acid mass obtained at a temperature below 75° C. and separating the acid while still in the liquid phase from the insoluble iron and aluminum metaphosphates.

2. A process for purifying phosphoric acid containing iron and aluminum compounds as impurities in the form of soluble salts which comprises heating the phosphoric acid to a temperature above 300° C. to convert the iron and aluminum impurities into insoluble salts, and the phosphoric acid into metaphosphoric acid, diluting and cooling the acid while still in a liquid phase with dilute phosphoric acid to a temperature which is maintained below about 75° C. to reconvert the metaphosphoric acid into phosphoric acid, and separating the still liquid phosphoric acid from the precipitated iron and aluminum salts.

3. A process for purifying crude phosphoric acid containing iron and aluminum salts which comprises heating the phosphoric acid to a temperature above 300° C. to convert the iron and aluminum orthophosphates into insoluble metaphosphates, and the phosphoric acid into metaphosphoric acid, diluting and cooling the acid while still in a liquid phase with water to a temperature which is maintained below about 75° C. to convert the metaphosphoric acid into phosphoric acid and separating the still liquid acid from the insoluble iron and aluminum metaphosphates.

4. A process for purifying phosphoric acid produced by the acid digestion of phosphate bearing rock and containing iron and aluminum salts which comprises heating the phosphoric acid to a temperature above 300° C. until the iron and aluminum salts are rendered insoluble by blowing hot gases through a liquid column of the acid, diluting the heated liquid acid obtained with dilute phosphoric acid to reconvert the metaphosphoric acid into phosphoric acid and separating the diluted acid mass obtained while still in the liquid phase from the insoluble iron and aluminum salts.

5. A process for purifying phosphoric acid produced by the acid digestion of phosphate bearing rock and containing iron and aluminum salts and volatile impurities, which comprises heating the phosphoric acid to a temperature above 300° C. by blowing hot gases through a liquid column of the acid until the iron and aluminum salts in the acid are converted into insoluble metaphosphates and the acid to metaphosphoric acid and the volatile impurities including fluorine compounds in the acid are substantially completely removed, diluting and cooling the acid while still in a liquid phase with water to a temperature which is maintained below about 75° C. and separating the still liquid acid from the precipitated iron and aluminum metaphosphates.

6. A process for preparing concentrated, food-grade, phosphoric acid from relatively impure phosphoric acid produced by the acid digestion of phosphate bearing rock and containing iron and aluminum salts and volatile fluorine compounds, which comprises heating the impure acid by passing hot gases through a liquid column of the acid in a carbon lined reaction vessel until the temperature is above about 300° C., maintaining the acid above 300° C. until the iron and aluminum salts in the acid are converted into insoluble metaphosphates and the phosphoric acid into metaphosphoric acid and the volatile fluorine compounds substantially completely removed from the acid by volatilization, diluting the heated acid while still in a liquid phase with a limited amount of water at a temperature which is maintained below about 75° C., separating the still liquid acid from the insoluble iron and aluminum metaphosphates and recovering pure concentrated orthophosphoric acid.

FRANK S. LOW.

REFERENCES CITED

The following references are of record in the file of this patent:

UNITED STATES PATENTS

| Number | Name | Date |
| --- | --- | --- |
| 393,428 | Giles et al | Nov. 27, 1888 |
| 446,815 | Glaser | Feb. 17, 1891 |
| 1,597,984 | LaBour | Aug. 31, 1926 |
| 2,022,050 | Levermore | Nov. 26, 1935 |
| 2,266,486 | Booth | Dec. 16, 1941 |
| 2,338,408 | Coleman | Jan. 4, 1944 |

OTHER REFERENCES

Mellor—Inorganic and Theoretical Chem.—vol. VIII, Longmans 1928, pp. 948–949. Copy in Div. 59.